United States Patent [19]

Millevoi

[11] 4,369,878
[45] Jan. 25, 1983

[54] CONVEYOR BELT TRACKING

[75] Inventor: Eugenio Millevoi, Fort Lee, N.J.

[73] Assignee: Weldotron Corporation, Piscataway, N.J.

[21] Appl. No.: 203,894

[22] Filed: Nov. 4, 1980

[51] Int. Cl.³ .............................................. B65G 39/16
[52] U.S. Cl. .................................................... 198/807
[58] Field of Search ............................... 198/806–808; 226/17, 21–23; 474/103, 104, 106

[56] References Cited

U.S. PATENT DOCUMENTS 3,069,056 12/1962 Richards et al. ........................ 226/22
3,193,086 7/1965 Wilhelm ................................ 198/807

FOREIGN PATENT DOCUMENTS 386815 9/1973 U.S.S.R. ................................ 198/808
447332 5/1975 U.S.S.R. ................................ 198/808

Primary Examiner—Joseph E. Valenza
Assistant Examiner—Douglas D. Watts
Attorney, Agent, or Firm—Robert A. Green

[57] ABSTRACT

The disclosure is of conveyor belt tracking apparatus comprising an endless conveyor belt having a right edge and a left edge and supported on rollers on which the belt is driven along a predetermined path. First and second rollers are provided under the belt adjacent to the left and right edges and sensing switches are provided adjacent to the left and right edges. The sensing switches are coupled to and turn on a motor having a drive shaft whose direction of rotation pivots the first and second rollers in the proper direction to bear against the belt to move it to the right or left to compensate for undesired belt movement to right or the left and to return the belt to the predetermined path.

3 Claims, 4 Drawing Figures

CONVEYOR BELT TRACKING

BACKGROUND OF THE INVENTION

Conveyor belts are normally of a web-like structure, and, as a result, they vary in density across their widths and lengths. As a result, such belts do not lie flat, and they tend to move from side to side on their rollers as they operate. Such lateral movement is undesirable because the belt may reach and rub on the conveyor frame and be damaged thereby, or any lateral movement by a conveyor belt may cause products carried thereby to fall off or be moved from the desired position on the belt.

Various solutions, including steering rollers, have been utilized in an attempt to solve this problem. Such solutions are not completely satisfactory, and they are undesirably complex and/or expensive.

DESCRIPTION OF THE INVENTION

Figure 1:
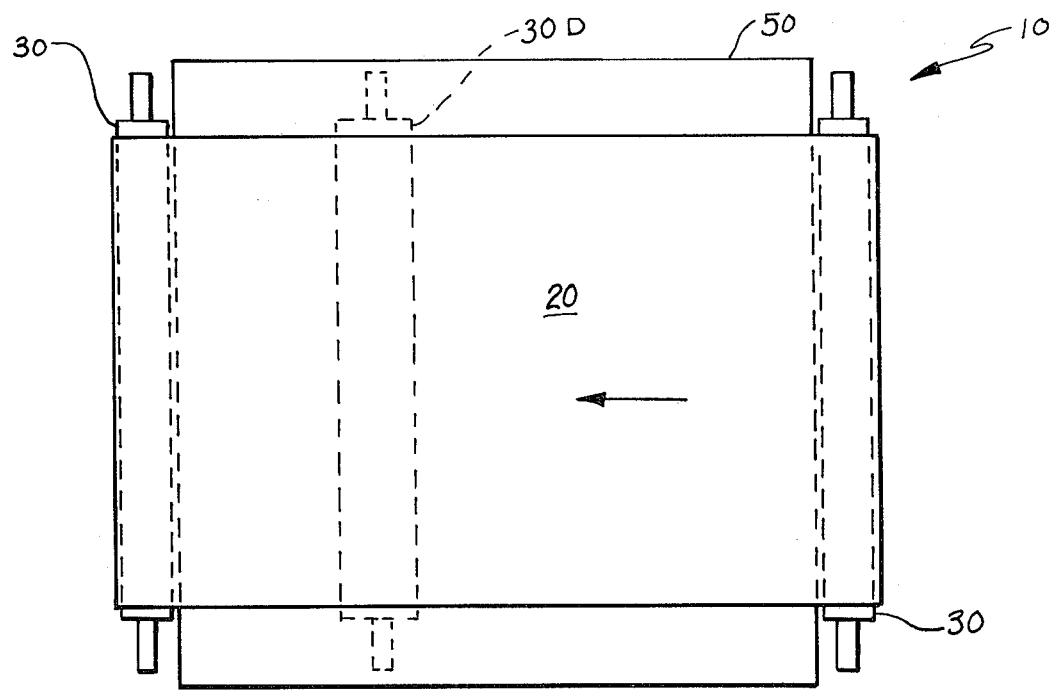
FIG. 1 is a plan view of a conveyor belt system utilizing the invention.

Apparatus 10 embodying the invention includes an endless conveyor belt 20 mounted on a plurality of horizontal rollers 30 which are used to guide and drive the belt in the direction of the arrow. A drive motor 40 is suitably coupled to one of the rollers 30D.

A suitable support frame 50 is provided for the belt including a horizontal portion 60 which supports the horizontal portion of the belt upon which articles are conveyor. The remainder of the belt and support rollers lie under the horizontal portion 60 of the frame.

Figure 3:
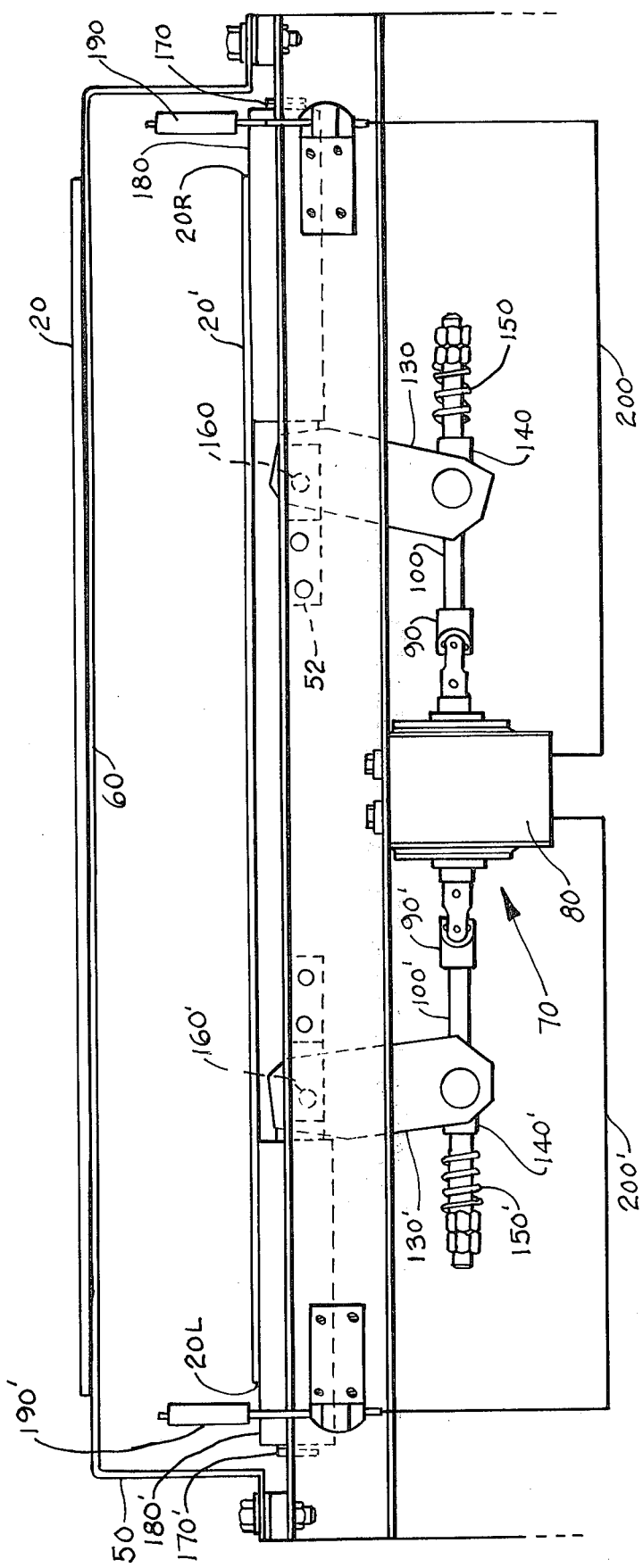
FIG. 3 is an end elevational view of the apparatus of FIG. 1 and the belt control apparatus of the invention.

The apparatus of the invention 70 (FIG. 3) serves to cause the conveyor belt to track properly along a desired path and counteract unwanted lateral movement. This apparatus is disposed beneath a lower portion 20' of the conveyor belt and includes a motor 80 coupled through a first universal joint 90 to a first horizontal threaded shaft 100 and through a second universal joint 90' to a second horizontal threaded shaft 100'. A first pivot block 130 has its lower end in engagement with the first threaded shaft 100 and is urged to the left along the shaft by a sleeve 140 threadeably mounted on the shaft 100 and urged to the left against the pivot block by a spring 150. The upper end of the pivot block 130 is pivotably coupled to a frame member 52 about a pivot 160. The upper end of the pivot block is also secured to a first generally horizontal roller shaft 170 on which is rotatably mounted a first roller 180. It can be seen that the pivoting of pivot block 130 about pivot 160 also pivots the first roller 180. The foregoing structural elements are on the right hand side of the apparatus 70, as seen in FIG. 3.

The left hand side of the apparatus comprises similar structural elements including a pivot block 130' coupled to threaded shaft 100', sleeve 140', spring 150', pivot 160', shaft 170', and roller 180'.

Initially, with the conveyor belt 20 properly oriented on its rollers 30, the control apparatus 70 is set so that the rollers 180, 180' are generally horizontal and are either just out of contact with the belt portion 20', or, if desired, they may just slightly contact the belt portion 20'. This adjustment can be made as required in any particular operating situation.

The right hand portions of apparatus 70 move oppositely to the left hand portions, i.e., if right hand pivot block 130 and its roller 180 pivot counter-clockwise, then the left hand pivot block 130' and its roller 180' pivot clockwise.

The apparatus 70 also includes left and right mechanical sensing switches 190 and 190' suitably and adjustably mounted on the frame 50 adjacent to the left hand and right hand edges 20L and 20R of the conveyor belt, as seen in FIG. 3. The switches 190 and 190' are positioned to sense the deviation of the conveyor belt from its normal path on its rollers 30.

The switches 190 and 190' are suitably connected to the motor 80 by leads 200 and 200', and other electrical connections (not shown) are provided as required.

Figure 2:
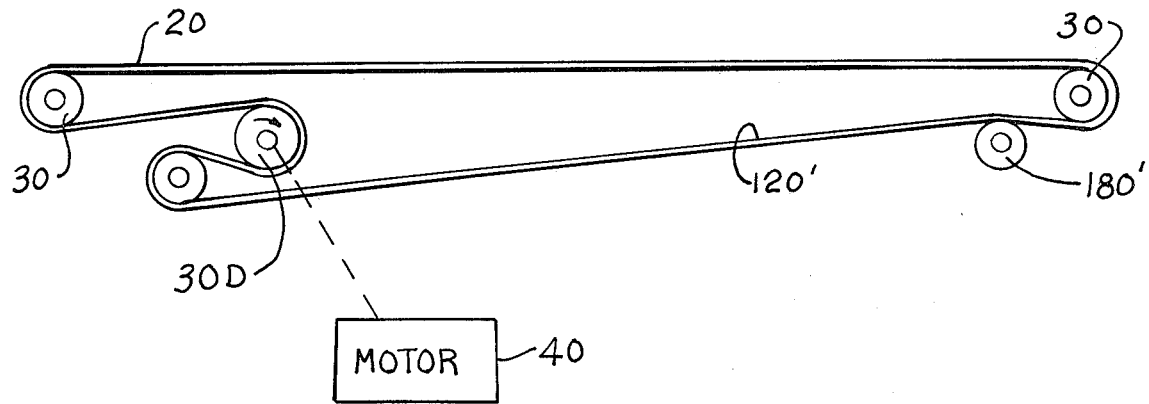
FIG. 2 is a side elevational view of the apparatus of FIG. 1.
Figure 4:
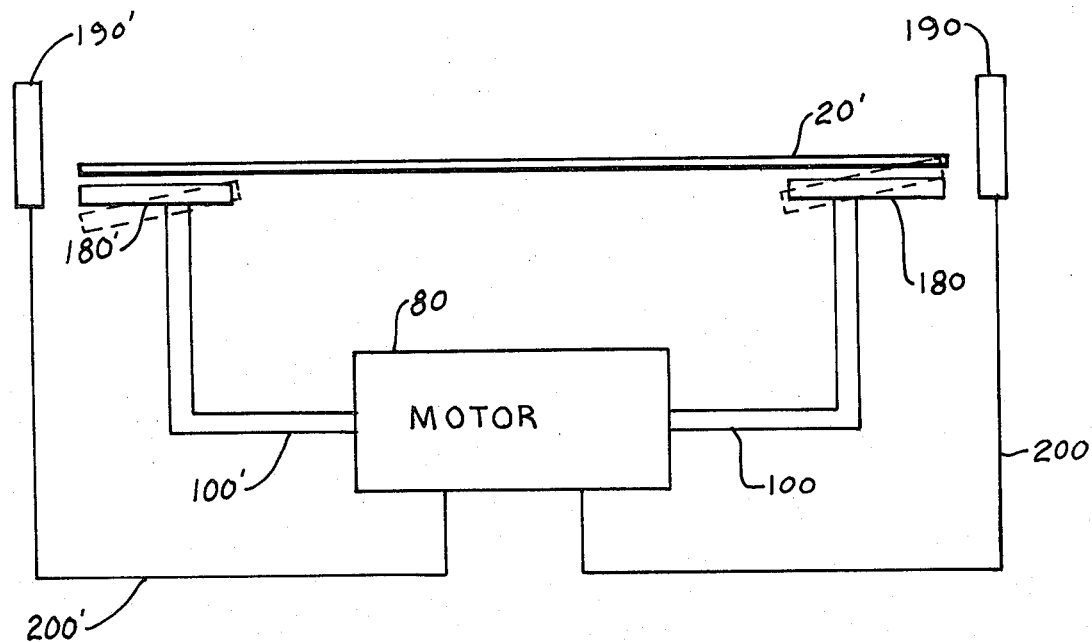
FIG. 4 is a schematic representation of the apparatus of the invention.

In operation of the invention, referring to FIG. 3 and the schematic representation in FIG. 4, as the conveyor belt 20 is driven in the direction of the arrow in FIG. 2, if it deviates from the desired nominal path and moves laterally to the right as seen in FIG. 3, it engages and closes switch 190, and this causes the motor 80 to rotate shafts 100 and 120 in the proper direction to cause the pivot block 130 to move to the right on shaft 100 against spring 150, and this causes the pivot block 130 to pivot counter-clockwise about pivot 160. This action causes shaft 170 and its roller 180 to pivot counter-clockwise so that roller 180 bears against the belt and exerts a leftward force on it and causes it to move to the left, away from the switch 170.

Simultaneously, in the left side, rotation of shaft 100' in the same direction as shaft 100, pivots pivot block 130' and roller 180' counter-clockwise, and this facilitates shafting of conveyor belt 20 to the left to return it to its normal or nominal path of movement. When the belt 20 moves leftward away from switch 190 to its nominal position of path of travel, the electrical circuit is opened, motor 80 is de-energized, shafts 100 and 100' stop rotating, and the rollers 180 and 180' maintain the position to which they had been rotated. If now, the belt moves to the left to close switch 190', the same corrective action occurs, this time at the left edge of the belt 20' to urge the belt to the right. Thus, as the apparatus 10 is operated, the position of the belt 20 is corrected each time it deviates from its nominal position and is maintained moving along the desired path of travel.

What is claimed is:

1. Conveyor belt tracking apparatus comprising
   a horizontal conveyor belt and means to drive it in a longitudinal direction along a desired straight path, said belt having left and right edges,
   a drive motor disposed beneath said conveyor belt and having left and right universal joints,
   a generally horizontal first threaded shaft secured to said right universal joint and a generally horizontal second threaded shaft secured to said left universal joint,
   a first pivot block having one, lower, end coupled to said first threaded shaft and adapted to move back and forth along said first threaded shaft,
   a second pivot block having one, lower, end coupled to said second threaded shaft and adapted to move back and forth along said second threaded shaft, a first guide roller horizontally disposed beneath the conveyor belt adjacent to the right edge of the conveyor belt, said first pivot block having its other, upper, end secured to said first guide roller, the coupling being such that movement of the lower end of the pivot block causes pivoting of the upper end of the pivot block and of the first roller secured thereto, a second guide roller horizontally disposed beneath the conveyor belt adjacent to the left edge of the conveyor belt, said second pivot block having its other, upper, end secured to said second guide roller, the coupling being such that movement of the lower end of the pivot block causes pivoting of the upper end of the pivot block and of the second roller secured thereto, a right switch disposed adjacent to the right edge of said conveyor belt and adapted to be contacted by said conveyor belt if said conveyor belt moves to the right as it proceeds in said direction, and a left switch disposed adjacent to the left edge of said conveyor belt and adapted to be operated by said conveyor belt if said conveyor belt moves to the left as it proceeds in said direction, said right and left switches being connected to said motor and adapted, when closed by said belt, to rotate said first and second threaded shafts in such directions as to cause said first and second pivot blocks to move along their shafts and pivot said first and second rollers in such a direction that one roller contacts the belt and applies a force which moves it back to its normal desired path of travel.

2. The apparatus defined in claim 1 and including a horizontal support on which said conveyor belt is supported as it moves, said first and second switches being mounted on said support.

3. The apparatus defined in claim 1 and including a plurality of guide rollers and at least one drive roller on which said conveyor belt is threaded.

* * * * *